United States Patent
Hellig et al.

(10) Patent No.: US 7,962,459 B2
(45) Date of Patent: Jun. 14, 2011

(54) METHOD OF PROVIDING CONTEXT SPECIFIC RECIPES IN A SEMICONDUCTOR FACILITY BY DEFINING PRODUCT CATEGORIES

(75) Inventors: Kay Hellig, Dresden (DE); Ronald Grünz, Dresden (DE); Heiko Wagner, Dresden (DE); Uwe Liebold, Kleinroehrsdorf (DE)

(73) Assignee: GLOBALFOUNDRIES Inc., Grand Cayman (KY)

( * ) Notice: Subject to any disclaimer, the term of this patent is extended or adjusted under 35 U.S.C. 154(b) by 2119 days.

(21) Appl. No.: 10/745,044

(22) Filed: Dec. 23, 2003

(65) Prior Publication Data
US 2004/0220968 A1 Nov. 4, 2004

(30) Foreign Application Priority Data
Apr. 30, 2003 (DE) .................................. 103 19 496

(51) Int. Cl.
*G06F 17/30* (2006.01)
(52) U.S. Cl. ..................................................... 707/705
(58) Field of Classification Search .............. 707/2, 200, 707/1; 700/96; 709/224
See application file for complete search history.

(56) References Cited

U.S. PATENT DOCUMENTS

| | | | |
|---|---|---|---|
| 6,035,293 A | 3/2000 | Lantz et al. | 707/1 |
| 6,415,192 B1 * | 7/2002 | Satoguchi | 700/96 |
| 6,988,183 B1 * | 1/2006 | Wong | 712/208 |
| 2002/0086218 A1 * | 7/2002 | Tejnil | 430/5 |

OTHER PUBLICATIONS

Johnston, "Installation Experiences on PROMIS," I.P. Sharp Associates, Toronto, Ontario.

* cited by examiner

*Primary Examiner* — Etienne P LeRoux
(74) *Attorney, Agent, or Firm* — Williams, Morgan & Amerson, P.C.

(57) ABSTRACT

The RMS database for a semiconductor process line is established on the basis of product groups or categories, wherein all members of a category are linked by a common feature, such as a common basic design or a common basic technology. Common process recipes in a specified category may then be set up only once, thereby reducing the amount of effort for establishing the database. Moreover, new product types may be readily incorporated into the categories, thereby enabling the employment of the already-established category-specific context information.

20 Claims, 2 Drawing Sheets

METHOD OF PROVIDING CONTEXT SPECIFIC RECIPES IN A SEMICONDUCTOR FACILITY BY DEFINING PRODUCT CATEGORIES

BACKGROUND OF THE INVENTION

1. Field of the Invention

Generally, the present invention relates to the field of fabricating integrated circuits, and, more particularly, to the management of process recipes required for processing different products at different process tools.

2. Description of the Related Art

Integrated circuits are typically manufactured in automated or semi-automated facilities, thereby passing through a large number of process and metrology steps to complete the device. The number and type of process and metrology steps a semiconductor device has to go through depends on the specifics of the semiconductor device to be fabricated. A usual process flow for an integrated circuit may include a plurality of photolithography steps to image a circuit pattern for a specific device layer into a resist layer, which is subsequently patterned to form a resist mask for further processes in structuring the device layer under consideration by, for example, etch or implant processes and the like. Thus, layer after layer, a plurality of process steps are performed based on a specific lithographic mask set for the various layers of the specified device. For instance, a sophisticated CPU requires several hundred process steps, each of which has to be carried out within specified process margins so as to fulfill the specifications for the device under consideration. Since many of these processes are very critical, a plurality of metrology steps have to be performed so as to efficiently control the process flow. Typical metrology processes may include the measurement of layer thickness, the determination of dimensions of critical features, such as the gate length of transistors, the measurement of dopant profiles, and the like. As the majority of the process margins are device specific, many of the metrology processes are specifically designed for the device under consideration and require specific parameter settings at the adequate metrology tools.

In a semiconductor facility, a plurality of different product types are usually manufactured at the same time, such as memory chips of different design and storage capacity, CPUs and the like, wherein the number of different product types may even reach a hundred and more in production lines for manufacturing ASICs (application specific ICs). Since each of the different product types may require a specific process flow, different mask sets for the lithography, specific settings in the various process tools, such as deposition tools, etch tools, implantation tools, CMP (chemical mechanical polishing) tools, and the like, may be necessary.

Hereinafter, the parameter setting for a specific process in a specified process tool or metrology or inspection tool may commonly be referred to as process recipe or simply as recipe. Thus, a large number of different process recipes may be required which have to be applied to the process tools at the time the corresponding product types are to be processed in the respective tools.

To avoid an incorrect processing of a specific product type, which is usually provided in the form of a plurality of substrates referred to as a lot, an automated recipe management system (RMS) database is frequently employed, storing the recipe for each available product type and each available process the product type has to undergo. A combination of a product type at a specific manufacturing stage and a process that may be available for this product type is herein also denoted as context or context point. Establishing and maintaining M times N context points, wherein M may represent the number of process steps and N may represent the number of product types, may result in an immense complexity of the RMS database and may also necessitate great effort in setting up the context point information, that is, the recipe information.

In conventional RMS regimes, therefore, the volume of the set-up information is frequently reduced in that the specific process flow or a part thereof, i.e., a sequence of two or more processes, which may also be denoted hereinafter as a process flow entity or simply an entity, is used as context point rather than employing every single process. Thus, the actual process flow for a specific product type may be divided into a plurality of smaller entities, at least some of which include two or more individual processes. Since, in many cases, several product types share one or more of the process flow entities, establishing the RMS database on the basis of the process flow entities may lower the number of context points required for the entirety of product types and may therefore reduce the complexity in setting up and maintaining the context information. That is, the process flow of each individual product type is to be defined as entries for the RMS database, wherein the process flow entities commonly used by all product types are to be entered only once.

Creating the context points on the basis of process flow entities may, however, not be helpful in reducing effort and complexity of context information relating to process steps that depend on the specifics of the mask set used for manufacturing a certain product type. For instance, the lithography patterning, the majority of metrology and defect inspection processes, a plurality of etch and CMP steps, and the like vary for different mask sets and thus require a separate set-up of context points for each product type, thereby rendering the above-explained approach with process flow entities inefficient, especially when a large number of product types is present in the process line and/or when new product types are frequently introduced. For example, in fabricating microprocessors, a specific product type may frequently be altered with respect to design and/or process recipes to provide minor design alternatives and/or new speed grades of basically the same product type, wherein each new alternative version or speed grade is then to be considered a new product type and requires the set up of new context points in the RMS database, thereby demanding a large amount of manpower of process engineers.

In view of the problems encountered in the conventional technique, an improved method is needed that allows more effective adaptation of process recipes to product types in a semiconductor process line, especially when a large number of different product types are present and/or when new product types are frequently introduced.

SUMMARY OF THE INVENTION

Generally, the present invention is directed to methods that enable the effective assignment of process recipes to product types by defining one or more categories, including plural product types that share a specific feature, such as a high degree of similarity of lithography mask sets, a technology node, or the like. Certain process recipes may then be established for each category, without the necessity of setting up corresponding recipes for the plurality of different product types belonging to the same category.

According to one illustrative embodiment of the present invention, a method of organizing a process flow for manufacturing a plurality of product types in a semiconductor facility comprises assigning the plurality of product types to one or more categories, wherein each of the one or more categories indicates at least one representative feature in manufacturing the plurality of product types. All product types assigned to a specific one of the one or more categories share the representative feature. Moreover, a database is established that includes information assigning one or more process recipes to each of the one or more categories.

According to still another illustrative embodiment of the present invention, a method of handling a recipe management system in a semiconductor process line comprises indicating identical types of circuits by a circuit type identifier and defining at least one common feature for a plurality of circuits having differing circuit type identifiers. Furthermore, those circuits having at least one common feature are assigned to a specific category. Additionally, for at least one process step to be applied to the circuits assigned to the specific category, a common process recipe is established. Finally, upon introducing a new circuit type having at least one common feature into the process line, the new circuit type is indicated by a new circuit type identifier and the new circuit type is assigned to the specified category.

BRIEF DESCRIPTION OF THE DRAWINGS

The invention may be understood by reference to the following description taken in conjunction with the accompanying drawings, in which like reference numerals identify like elements, and in which.

Figure 1:
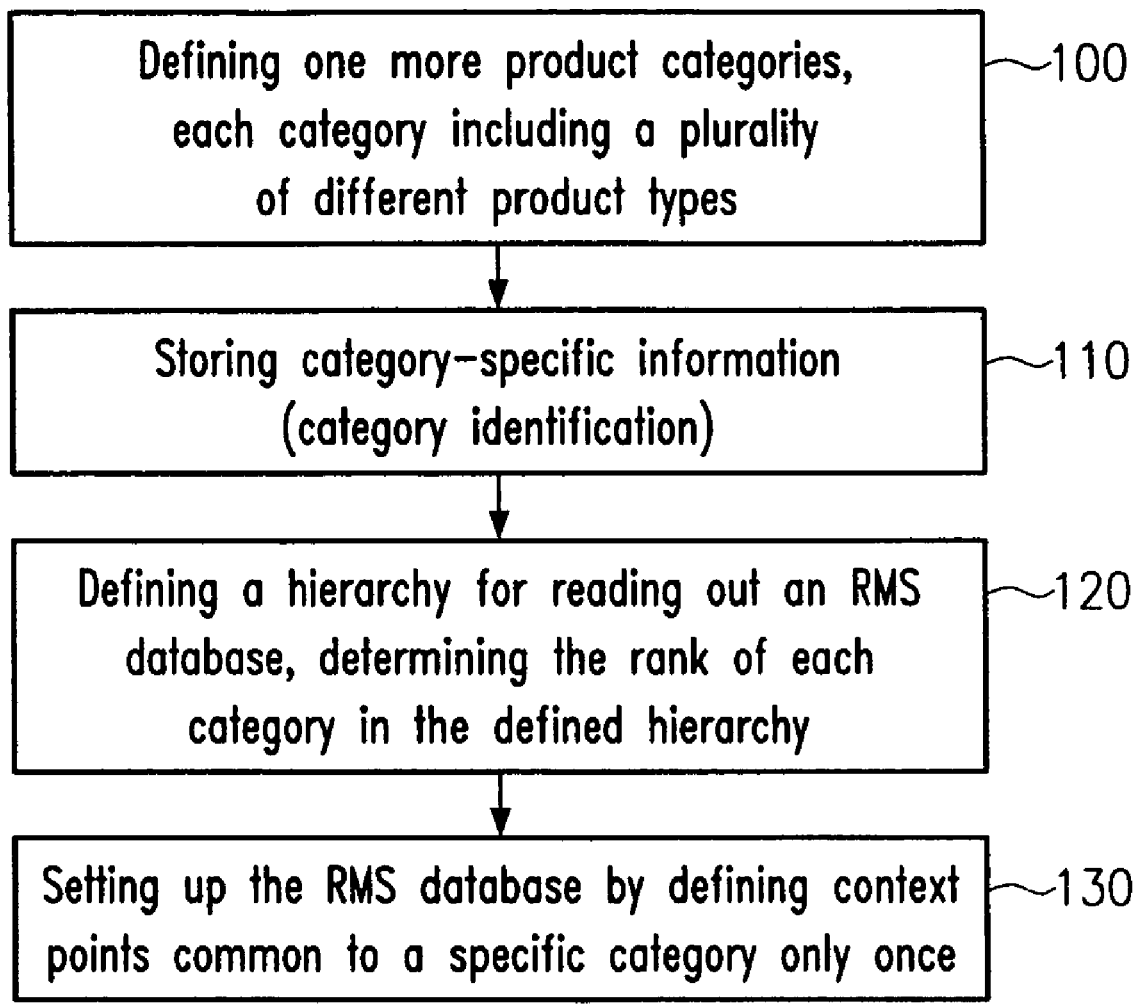
FIG. 1 schematically shows a flowchart for handling process recipes in a semiconductor line according to illustrative embodiments of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present invention will now be described with reference to the attached figures. Although the various regions and structures of a semiconductor device are depicted in the drawings as having very precise, sharp configurations and profiles, those skilled in the art recognize that, in reality, these regions and structures are not as precise as indicated in the drawings. Additionally, the relative sizes of the various features and doped regions depicted in the drawings may be exaggerated or reduced as compared to the size of those features or regions on fabricated devices. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

The present invention is based on the concept of reducing the effort for establishing context information in an automated RMS using a recipe database, in that a few categories are defined that are linked by a common feature. For example, 3-5 different categories may suffice to cover a plurality of different product types, such as microprocessors of differing circuit generation and differing speed grade. The members of one category may share a plurality of process recipes for certain processes or process flow entities, which then need to be defined only once, even if a "new" member of the category, that is, a new product type, has to be introduced due to, for example, a minor alteration in the mask set or the modification of certain processes to obtain a higher operation speed of the basic product type compared to a preceding product type. In other words, although a new product type is introduced into the process line, the context information does not need to be set up for the entire process flow of the product type, but instead requires merely the definition of those context points that are specific for the new product type, thereby significantly enhancing the efficiency of updating the RMS database.

With reference to FIG. 1, further illustrative embodiments of the present invention will now be described. According to step 100 of the flowchart of FIG. 1, one or more categories are defined on the basis of the product types that are to be processed in the process line. The categories may be selected so that each member of the category shares at least one common feature. In one embodiment, a plurality of different versions of a circuit type may be processed in the process line. Thus, these different versions of the same basic circuit design represent different product types, wherein each product type may be indicated by a specific product identification that uniquely identifies the specific circuit layout and thus the specific process flow thereof. For instance, the basic circuit design may represent a microprocessor MP1 produced by a certain mask set, denoted as mask set A1, according to a specified process flow. The identification of this product type may then be denoted as, for instance, MP1-A1. A variation of the processor MP1 may include, for instance, a modified I/O port design and the modified mask set may be denoted as A2. Thus, the identification of this varied product type may be MP1-A2. A further variant of the microprocessor MP1 may include further design features, such as additional internal storage areas in the form of RAM cells, and the respective mask set may be indicated as A3. Hence, the identification for the product type indicated by the mask set A3 for the basic processor design MP1 may be MP1-A3. Frequently, two or more speed versions of the circuit design under consideration may be obtained by modifying processes in manufacturing the device. For example, optimizing one or more process steps, such as deposition and etch steps for critical features of the circuit, may enable the reduction of process margins and thus provide for higher operating speeds of the circuit. In the present example, it is assumed that two speed grades, S1 and S2, are available for all product types specified above. Consequently, the complete product type identifications for the above specified product types may be summarized as follows:

| | | |
|---|---|---|
| MP1-A1-S1 | processor design MP1 | speed grade 1 |
| MP1-A1-S2 | processor design MP1 | speed grade 2 |
| MP1-A2-S1 | MP1, modified I/O | speed grade 1 |
| MP1-A2-S2 | MP1, modified I/O | speed grade 2 |
| MP1-A3-S1 | MP1, modified RAM | speed grade 1 |
| MP1-A3-S2 | MP1, modified RAM | speed grade 2 |

According to the present invention, the above-identified six product types may be assigned to a common category, which may be defined as MP1, wherein the common feature shared by all members of the category MP1 is the basic design, that is the similarity of the mask sets A1-A3 used to lithographically define the circuit features.

It should be noted that the category presented above is merely of illustrative nature and any other appropriate criteria may be employed to define a category for a plurality of different product types. For instance, in other embodiments, the common feature of a category may be represented by the process technology used for manufacturing the circuit under consideration. That is, the critical design dimension may be used as information to classify some or all of the product types manufactured in a process line. For example, a plurality of ASIC devices may be fabricated, wherein the design thereof may significantly vary, whereas the technology information, for instance, in the form of the minimum feature size, such as 250 nm, 180 nm, 130 nm, 100 nm, and so on, may then be used to group the various ASIC devices, since each of these technology nodes may entail lithography and other process step related similarities, resulting in a plurality of common recipes for each product type of the same technology node.

In other embodiments, a plurality of different categories may be defined, such as different categories for different basic microprocessor designs and/or one or more of the above-identified technology nodes may be simultaneously present in the process line.

In one illustrative embodiment, the number of categories is selected to be 3-5 for approximately 20-100 different product types to be manufactured in the process line. Three to five different product types for the above specified range of different product types allows significant reduction in the effort required for generating the set up information, as will be described later on, while still maintaining the complexity for choosing the appropriate category for each product type at a low level.

In another embodiment, the number of categories may be selected to be in the range of 1-10 for approximately 30-100 different product types. In still other embodiments, the number of categories may be selected so as to minimize the number of set-up procedures for a given number of different product types. To this end, the number of process recipes that a certain preliminarily defined category shares may be estimated for all preliminarily selected categories and then the total number of process recipes for all preliminary categories is summed up. This procedure may be repeated for a plurality of preliminary categorizations, and the set of categories yielding the minimal number of process recipes may be selected as the final categorization. Hereby, the term categorization may describe the act of defining a category by selecting one or more representative features linking all the members of one category together.

It should be noted that each categorization, that is, each set of a specified number of categories, is determined by the common feature of each category in a selected set of categories, and therefore the finally obtained number of required context points for all of the different product types in the process line is also determined by the choice of the common feature(s) linking the product types of each category. If the determination of the minimal number of context points as criterion for selecting the proper categories, as described in the preceding paragraph, is considered inappropriate due to the complexity of the determination of the number of context points for a plurality of preliminary categorizations, an appropriate set of categories may be selected on the basis of the above-identified criteria, such as similarity of lithography mask sets or technology node information. In other cases, the experience of the process engineer may be a guidance for properly selecting a common feature and thus the number of categories for a given product plurality. In the example given above for the microprocessor MP1 represented by six different product types, it may be assumed that approximately 500 individual process steps may be necessary for completing each of the devices. In the conventional approach, even when including the approach of common process flow entities representing sequences that all of the six product types share, remarkably more context point set-ups are required, since the alterations in the mask sets and the process parameters, although being of minor differences, may not permit effective definition of common process flow entities associated to lithography, metrology and inspection steps and the like. For convenience, it may be assumed that it is possible to define 200 process steps in the form of a plurality of process flow entities that are identical for the six product types. Therefore, all of the six product types may additionally require context information for the remaining 300 process steps. In total, 1800 context information pieces plus the 200 shared context points may have to be set up.

In the present invention, the context information is established on the basis of the category information and, due to the common feature, such as the similarity of the mask sets used, a plurality of process steps are identical for all members of the specified category in addition to the 200 identical process flow entities. For instance, despite the differences at the lithography tool caused by the different mask sets, the development step for generating the resist mask on the substrate may be identical for all members of the category. Thus, the corresponding context information for this process step has to be established only once, compared to six times in the conventional case. When, for example, the definition of the category, that is the common feature, leads to 50 shared processes, the total number of context points to be input into the RMS database is reduced by 250 compared to the conventional case. Of course the reduction in context information depends on the number of members per category and the feature linking the members of the category together. Although the above numbers are of illustrative nature only, it may readily be appreciated that a significant improvement for establishing the database is obtained, irrespective of the exact number of shared recipes and of the product types in each category. Moreover, the above considerations also apply to a situation when a plurality of categories are defined.

Figure 2:
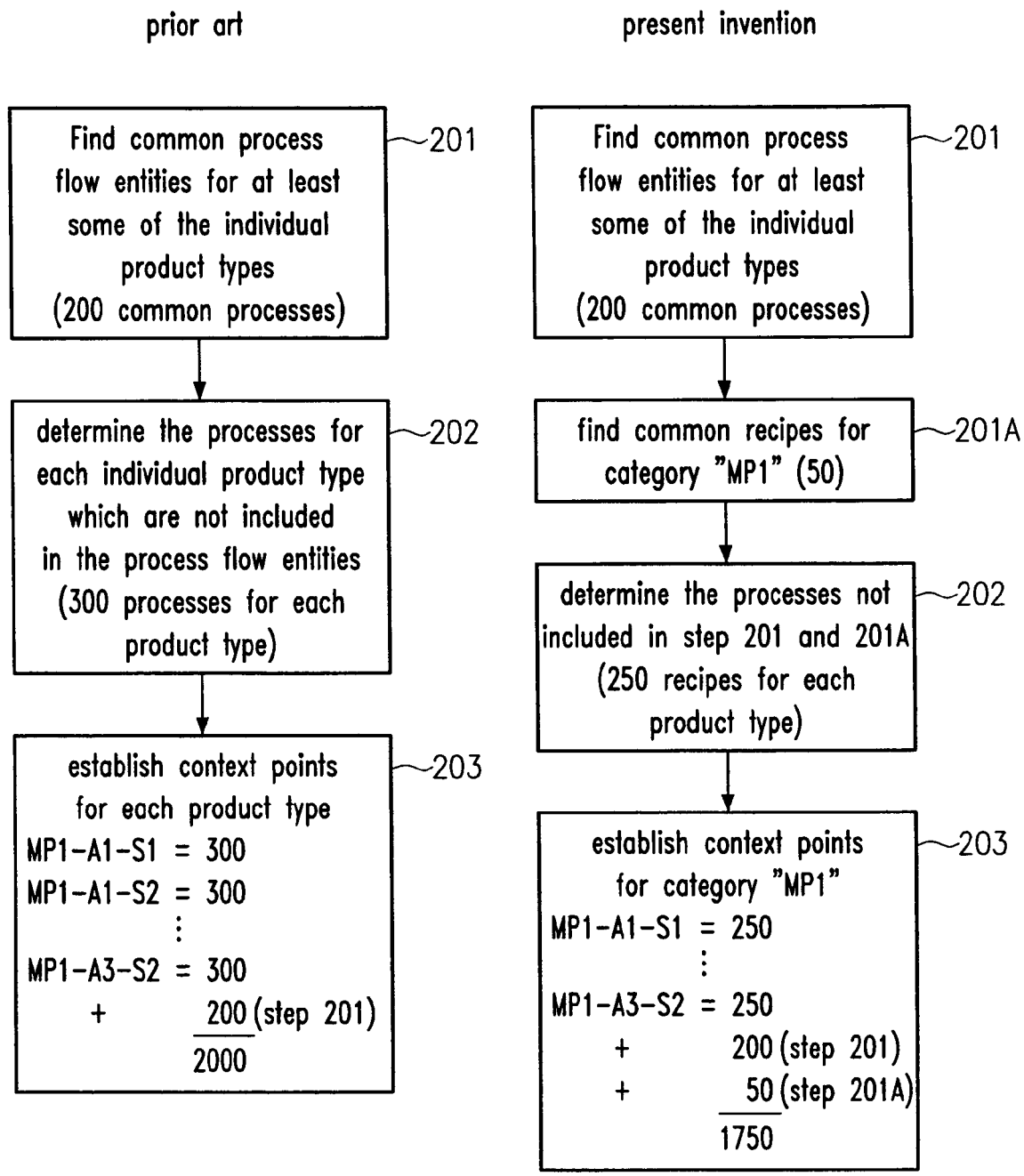
FIG. 2 depicts a flowchart of one illustrative example of a conventional process compared to an illustrative example according to the present invention.

FIG. 2 schematically depicts flowcharts according to the above-described conventional example and the example according to the present invention in which, contrary to the prior art, a category "MP1" is defined. In step 201 in the prior art example and the present invention, common process flow entities are obtained according to the 200 common recipes. In the present invention, then, in step 201A, further common recipes may be determined, even if these recipes represent single processes that may not be "embedded" into a process flow entity. Due to the definition of a category, these common single recipes may be assigned to the category identifier "MP1" and are thus retrievable from the RMS database. In step 202, the remaining processes are determined in both the prior art and the present embodiment. Finally, in step 203, the context points are set up, wherein the number according to the example of the present invention is significantly reduced compared to the prior art example.

A further advantage of the present invention regards the introduction of a new product type into the process line. Depending on the characteristics of the new product, it may be assigned to the appropriate category and the context information already set up for this specific category may conveniently be used for the new product type. In the conventional case, however, a complete set up is necessary except for any possible identical process flow entities.

Again referring to FIG. 1, in step 110, the information relating to the category, for instance, an identifier for the category, such as MP1, or the technology node and the like, may be stored in a database. The database for the category information may be a database storing other structural data of product types to be manufactured, a database connected to a facility management system or any other database. Storing the category information, such as the category identifier, in an appropriate database enables one to track substrates throughout all the process steps by relating the substrate identification to the product type identifier and the category identification so as to select the correct recipe at each process or metrology tool.

In step 120, the category or categories are evaluated with respect to its or their ranks in a hierarchy defined for reading a recipe from the RMS database. When a product arrives at a process tool, the RMS database is accessed to provide the correct recipe for the substrate of interest. Since the context information is established on the basis of the category the substrate of interest belongs to, the recipe for the specific process step may not in some cases be unambiguously retrieved. Therefore, the hierarchy resolves the unambiguousness in that the ranking of the category information is considered. In one illustrative embodiment, the rank of the product type identification, such as MP1-A1-S1 in the aforegiven example, is higher than the respective category identification MP1. When, therefore, two or more recipes exist for a given category, the unique recipe for the substrate under consideration may be selected by querying the RMS database while following the established ranking. For example, the RMS database query may be carried out on the basis of the category identification, the process flow, the process step, the process tool and the product identification, wherein the higher ranking of the product type identification in relation to the category identification then results in the correct retrieval of the recipe, even if a plurality of recipes would match the database query when performed on the basis of the category identification.

In step 130, after the categories are defined and the hierarchy for reading out the RMS database is determined, the RMS database is actually provided with the context information, that is, with the recipe for respective process steps. As previously explained, a plurality of context information that is specific for each category has to be entered only once for each category, thereby significantly facilitating the database set up. The set up is especially facilitated for process steps and process flow sequences depending on the mask sets.

When the RMS database is to be updated due to the introduction of a new product type, the new product type is to be assessed with respect to the categorization criteria. After a category is found that matches the characteristics of the new product type, the corresponding product type identification is assigned to the respective category and the context information has to be input into the RMS database for recipes only that are unique for the new product type.

As a result, the set up of the RMS database is significantly facilitated, especially for integrated circuits requiring a frequent modification of a basic circuit design. For instance, microprocessors of future speed grades and/or other minor modifications may more conveniently be implemented into the RMS database due to the one-time definition of category-specific context information, thereby avoiding redundant and tedious work for establishing context information on the basis of the conventional approach. It should be noted that the present invention is fully compatible with conventional techniques in that the employment of common process flow sequences, that is, process flow entities, may also be implemented within the concept of categories. Thus, conventional RMS database programs may be modified in accordance with the present invention, thereby maintaining the advantages obtained by using common process flow entities, while at the same time set up and updating is facilitated due to the employment of product categories.

The particular embodiments disclosed above are illustrative only, as the invention may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method of organizing a process flow for manufacturing a plurality of product types in a semiconductor facility, the method comprising:

assigning said plurality of product types to one or more categories, wherein each of said one or more categories indicates at least one representative feature in manufacturing said plurality of product types that is shared by all product types assigned to a specific one of said one or more categories; and establishing a database including information that assigns one or more process recipes to each of said one or more categories.

2. The method of claim 1, further comprising defining, at least on the basis of said one or more categories and a product type identifier, a hierarchy for reading out at least one recipe from said database.

3. The method of claim 2, wherein a rank of said product type identifier is higher than a rank of said one or more categories.

4. The method of claim 2, wherein, prior to processing a specified product type in a specified process, a process recipe is read out from said database on the basis of the product type identifier, the category which the specified product type is assigned to, the type of process step and a process flow entity.

5. The method of claim 1, wherein each of said categories represents a unique circuit architecture.

6. The method of claim 5, wherein said unique circuit architecture represents a specific CPU generation.

7. The method of claim 1, wherein said representative feature for a specified category is a similarity of lithography mask sets used for manufacturing the product types assigned to said specified category.

8. The method of claim 1, wherein said representative feature for a specified category is a structural feature of one or more circuit elements.

9. The method of claim 8, wherein said structural feature is a minimal design feature size.

10. A method of handling a recipe management system database in a semiconductor process line, the method comprising:
    indicating identical types of circuits by a circuit type identifier;
    defining at least one common feature for a plurality of circuits having differing circuit type identifiers;
    assigning those circuits having said at least one common feature to a specific category;
    establishing for at least one process step to be applied to said circuits assigned to the category a common process recipe; and
    upon introducing a new circuit type having said at least one common feature into said process line, indicating said new circuit type by a new circuit type identifier and assigning said new circuit type to said specified category.

11. The method of claim 10, further comprising defining, at least on the basis of said specific category and a product type identifier, a hierarchy for reading out said database.

12. The method of claim 11, wherein a rank of said product type identifier is higher than a rank of said specific category.

13. The method of claim 11, wherein, prior to processing a specified product type in a specified process, a process recipe is read out from said database on the basis of the product identifier, the category which the specified product type is assigned to, the type of process step and a process flow entity.

14. The method of claim 10, wherein said specific category represents a unique circuit architecture.

15. The method of claim 14, wherein said unique circuit architecture represents a specific CPU generation.

16. The method of claim 10, wherein said representative feature for the specified category is a similarity of lithography mask sets used for manufacturing the product types assigned to said specified category.

17. The method of claim 10, wherein said representative feature for a specified category is a structural feature of one or more circuit elements.

18. The method of claim 17, wherein said structural feature is a minimal design feature size.

19. The method of claim 10, wherein a plurality of categories are defined.

20. The method of claim 19, wherein three to five categories are defined.

* * * * *